US012718223B2

(12) United States Patent
Venkatakrishnan et al.

(10) Patent No.: US 12,718,223 B2
(45) Date of Patent: Aug. 25, 2026

(54) USER AUTHENTICATION USING A BROWSER COOKIE SHARED BETWEEN A BROWSER AND AN APPLICATION

(71) Applicant: PayPal, Inc., San Jose, CA (US)

(72) Inventors: Poornima Venkatakrishnan, San Jose, CA (US); Jeffrey Edward Harrell, San Jose, CA (US); Teddy Vincent Toms, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/753,545

(22) Filed: Jun. 25, 2024

(65) Prior Publication Data

US 2025/0021960 A1 Jan. 16, 2025

Related U.S. Application Data

(63) Continuation of application No. 17/681,747, filed on Feb. 26, 2022, now Pat. No. 12,051,056, which is a (Continued)

(51) Int. Cl.
*G06Q 20/32* (2012.01)
*G06Q 20/12* (2012.01)
(Continued)

(52) U.S. Cl.
CPC ......... *G06Q 20/3227* (2013.01); *G06Q 20/12* (2013.01); *G06Q 20/3223* (2013.01);
(Continued)

(58) Field of Classification Search
None
See application file for complete search history.

(56) References Cited

U.S. PATENT DOCUMENTS 6,374,359 B1 4/2002 Shrader et al.
8,255,324 B2 8/2012 Bercy et al.
(Continued)

FOREIGN PATENT DOCUMENTS

WO WO-2009070430 A2 * 6/2009 ........... G06Q 20/223
WO 2014016619 A1 1/2014

OTHER PUBLICATIONS

Spoorthi, V., “Mobile Single Sign-On Solution for Enterprise Cloud Applications”, 2014 First International Conference on Networks & Soft Computing. (Year: 2014).*
(Continued)

*Primary Examiner* — Clay C Lee
(74) *Attorney, Agent, or Firm* — Haynes and Boone, LLP

(57) ABSTRACT

A system and/or method may be provided to authenticate a user. An example method of authenticating a user includes receiving, by a merchant application, a user request to complete a transaction using a payment service provider. The method also includes in response to receiving the user request to complete the transaction, retrieving, by the merchant application, a browser cookie stored on a user device and associated with one or more user interactions with a browser included in the user device and the payment service provider. The method further includes in response to receiving the user request to complete the transaction, launching, by the merchant application, an instance of the browser that reads the browser cookie and authenticates the user based on the browser cookie.

20 Claims, 13 Drawing Sheets

Related U.S. Application Data continuation of application No. 15/141,543, filed on Apr. 28, 2016, now Pat. No. 11,321,700.

(51) Int. Cl.

| | |
|---|---|
| ***G06Q 20/36*** | (2012.01) |
| ***G06Q 20/38*** | (2012.01) |
| ***G06Q 20/40*** | (2012.01) |
| ***G06Q 30/06*** | (2023.01) |
| ***G06Q 30/0601*** | (2023.01) |

(52) U.S. Cl.

CPC ... *G06Q 20/3674* (2013.01); *G06Q 20/38215* (2013.01); *G06Q 20/401* (2013.01); *G06Q 30/0601* (2013.01)

(56) References Cited

U.S. PATENT DOCUMENTS

| | | | | |
|---|---|---|---|---|
| 8,364,590 | B1 | 1/2013 | Casey et al. | |
| 9,324,098 | B1 * | 4/2016 | Agrawal ................ | G06Q 30/04 |
| 10,467,615 | B1 | 11/2019 | Omojola et al. | |
| 11,074,644 | B2 | 7/2021 | Loganathan | |
| 2007/0295798 | A1 | 12/2007 | Ho et al. | |
| 2009/0150288 | A1 | 6/2009 | Bishop et al. | |
| 2009/0292619 | A1 | 11/2009 | Kagan et al. | |
| 2011/0191162 | A1 * | 8/2011 | Blackhurst ......... | G06Q 30/0239 705/14.39 |
| 2012/0016768 | A1 | 1/2012 | Bezos et al. | |
| 2012/0150688 | A1 * | 6/2012 | Li ...................... | G06Q 30/0641 705/26.41 |
| 2013/0036030 | A1 | 2/2013 | Mengerink et al. | |
| 2013/0268400 | A1 * | 10/2013 | Ballard ............. | G06Q 30/0641 705/26.8 |
| 2014/0250007 | A1 | 9/2014 | Howe | |
| 2015/0026062 | A1 | 1/2015 | Paulsen et al. | |
| 2015/0058162 | A1 | 2/2015 | Purves | |
| 2015/0186984 | A1 | 7/2015 | Loganathan | |
| 2015/0206215 | A1 | 7/2015 | Bui | |
| 2015/0310430 | A1 | 10/2015 | Goldstone | |
| 2015/0363581 | A1 * | 12/2015 | Ranadive ................ | G06F 21/34 726/19 |
| 2016/0148304 | A1 | 5/2016 | Srinath et al. | |
| 2017/0357976 | A1 | 12/2017 | Malik et al. | |
| 2021/0081927 | A1 | 3/2021 | Tang et al. | |
| 2021/0272102 | A1 | 9/2021 | Purves | |

OTHER PUBLICATIONS

Alabrah A., et al., "Enhancing Security of Cookie-Based Sessions in In Mobile Networks using Sparse Caching," Int. J. Inf. Secur, 2014, 13 pages.

Coldewey D., "Unity U-Turns on Controversial Runtime Fee and Begs Forgiveness," retrieved on Sep. 22, 2023, 7 pages.

Deniss W., et al., "OAuth 2.0 for Native Apps; draft-ietf-oauth-native-apps-01.txt", Internet Engineering Task Force, IETF, OAuth Working Group, Mar. 20, 2016, pp. 1-16.

European Appl. No. 17790472.9, Extended European Search Report mailed Oct. 22, 2019, 7 pages.

International Appl. No. PCT/US2017/029951, International Search Report and Written Opinion mailed Jul. 14, 2017, 08 pages.

International Preliminary Report on Patentability for Application No. PCT/US2017/029951 mailed on Nov. 8, 2018, 8 pages.

Perez S., et al., "PayPal Brings Its Instant Checkout Service "One Touch" Across the Web," Apr. 28, 2015, 4 pages.

Rey J.D., "PayPal Introduces One-Touch Mobile Payments, Thanks to Braintree and Venmo," Aug. 19, 2014, 5 pages.

Roesner F., "Security and Privacy from Untrusted Applications in Modern and Emerging Client Platforms," ProQuest Dissertations and Theses, ProQuest Dissertations Publishing, 2014, 202 pages.

Summons to Attend Oral Proceedings for European Application No. 17790472.9, mailed on Jun. 13, 2024, 17 pages.

Wikipedia., "PayPal," retrieved from the Internet: URL: https://en.wikipedia.org/w/index.phptitle=PavPal&oldid=1174011985, 45 pages.

* cited by examiner

USER AUTHENTICATION USING A BROWSER COOKIE SHARED BETWEEN A BROWSER AND AN APPLICATION

CROSS REFERENCE TO RELATED APPLICATIONS

The present application is a continuation application of U.S. patent application Ser. No. 17/681,747, filed Feb. 26, 2022, which is a continuation of U.S. patent application Ser. No. 15/141,543, filed Apr. 28, 2016, now U.S. Pat. No. 11,321,700, and is incorporated in reference in its entirety.

BACKGROUND

Field of the Invention

The present disclosure generally relates to systems and methods for authenticating a user.

Related Art

More and more consumers are purchasing products and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PAYPAL®, Inc. of San Jose, CA. Such payment service providers can make transactions easier and safer for the parties involved. Purchasing with the assistance of a payment service provider from the convenience of virtually anywhere is one main reason why on-line and mobile purchases are growing very quickly.

Before a payment service provider renders services to a user, the payment service provider will typically request the user's user credentials in order to authenticate the user. It may be inconvenient for the user to provide her user credentials to the payment service provider each time she desires to use the services of the payment service provider, especially if the user uses the payment service provider quite often. Additionally, nowadays, users typically have multiple accounts with different websites. For each website, the user has a username and password to remember. Accordingly, it may be inconvenient for the user to remember her username and password for the payment service provider.

Additionally, many payment transactions enabled by online or mobile payment service providers such as, for example, retail purchases, payment transactions, and the like, are made electronically using electronic devices, such as mobile phones or mobile computing devices. For example, a consumer may install a payment application provided by the payment service provider on his or her mobile device to facilitate payments to various merchants or recipients. An online or mobile payment process utilizing the payment application typically includes user authentication that requires a user to enter a login identifier (ID) and/or a password to authenticate the user. Nevertheless, the authentication process may cause inconvenience to the user especially if the user is in a hurry or if a keyboard is not included with the mobile device for the user to type in the login ID or password. As such, the authentication process may delay the overall payment process and cause the payment process to take longer than making a payment with cash, which can discourage the use of online or mobile payments. Therefore, there is a need for a system or a method that implements an easier authentication process on user devices.

Figure 1:
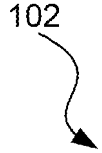
FIG. 1 is an example page that is displayed by a merchant application on a display of a user device.
Figure 1:
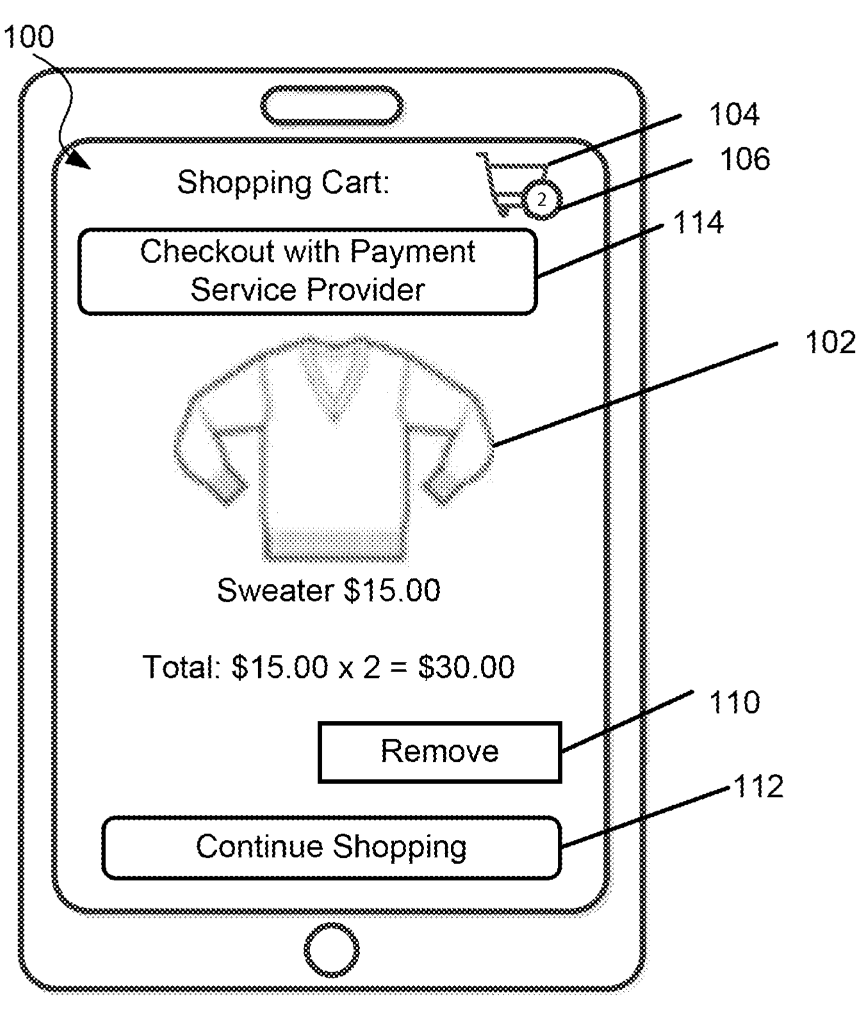

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

A user may use a user device to access a merchant application and desire to purchase products and/or services (e.g., collectively referred to as items) provided by a merchant via the merchant application. In an example, the merchant application is a mobile app installed on the user device. In another example, the merchant application is a web application accessible via a uniform resource locator (URL) to which a browser executing on the user device points. The user may interact with the merchant application to purchase items by placing them into an electronic shopping cart provided by the merchant application. Additionally, the merchant application may provide the user with the option to complete the purchase (or any transaction) using an account the user has with a payment service provider.

Typically, if the user requests to complete a transaction using the payment service provider while interacting with a merchant application, the merchant application directs the browser executing on the user device to the payment service provider's website for authentication purposes. A payment provider server managed by the payment service provider may request the user to enter her user credentials and authenticate the user based on the entered user credentials. An authentication service may provide an authenticated login session to the user via the user device and allow the user access to services provided by the payment provider server if the user is authenticated. If the user is successfully authenticated, the payment provider server provides the user device with a browser cookie and an access token to access the services of the payment provider server. The browser may receive the browser cookie from the payment provider server and store it in a browser memory. The browser cookie may include a refresh token, which allows the user device to obtain fresh access tokens from the payment provider server (e.g., secure token service) without having to enter user credentials. As such, it may be unnecessary for the user to enter her user credentials in order to obtain an access token and thus access resources provided by the payment provider server.

The present disclosure provides techniques for the merchant application to authenticate the user by accessing the browser cookie stored in the browser memory and without the user being prompted to enter her user credentials. While in the merchant application, if the user attempts to purchase items and requests to complete a transaction using the payment service provider, the merchant application accesses the browser cookie that was previously received from the payment provider server and stored in the browser memory, launches an instance of the browser, and passes the browser cookie to the browser instance. The browser instance may perform further actions to authenticate the user, without the user being requested to enter her user credentials. Accordingly, if the user requests to complete a transaction with the payment service provider while in the merchant application, it may be unnecessary for the user to sign in and provide her user credentials to the payment service provider. Rather, if the refresh token is still "alive" on that same user device (e.g., cookie has not yet expired and cookie's value is valid), the payment provider server may authenticate the user without the user being prompted to enter her user credentials. In this example, the payment provider server that is maintained by the payment service provider skips the request for a user login and subsequent receipt of user provided login information, and instead authenticates the user based on information stored in the browser cookie. In this way, the user may be authenticated by the payment service provider without being prompted to provide her user credentials for the current session.

If the user is successfully authenticated, the payment provider server provides the user device with a new access token for accessing services provided by the payment service provider. Accordingly, the user may complete transactions using an account the user has with the payment service provider while still in the merchant application, without having to provide her user credentials to the payment provider server. Additionally, the user may complete transactions using an account the user has with the payment service provider on different merchant applications or websites, without having to provide her user credentials to the payment provider server. Accordingly, the user may enjoy the experience of not having to enter her user credentials and may be provided with a more streamlined experience.

Unless specifically stated otherwise, as apparent from the following discussion, it is appreciated that throughout the description, discussions utilizing terms such as "receiving", "sending", "storing", "providing", "generating," "determining", and "authenticating", "retrieving," "launching," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A user may interact with a merchant application. FIG. 1 is an example page 100 that is displayed by the merchant application on a display of a user device 102. Page 100 includes content that may be controlled and provided by the merchant. In the example illustrated in FIG. 1, page 100 includes one or more items 102 that are provided by the merchant and included in a user's electronic shopping cart 104 provided by the merchant application. The user has two items 102 in electronic shopping cart 104, as indicated by a number in a circle 106.

Page 100 also includes user selectable options that if selected by the user cause particular actions to be performed. The user may select a user selectable option 110, which is labeled "Remove," to remove the items displayed on page 100 from electronic shopping cart 104. Alternatively, the user may select a user selectable option 112, which is labeled "Continue Shopping," to view other item(s) offered by the merchant application. In response to the user selecting user selectable option 112, the merchant application may display one or more items provided by the merchant that the user may place into electronic shopping cart 104 for purchase. The user may then proceed to place items into electronic shopping cart 104. Alternatively, the user may select user selectable option 114 to check out with a payment service provider and complete the transaction using the payment service provider, with the items currently in electronic shopping cart 104. In response to the user selecting user selectable option 114, the merchant application may receive the user's request to complete a transaction using the payment service provider.

Figure 2:
FIG. 2 is a flowchart illustrating an embodiment of a method of a merchant application using a browser cookie stored in a browser memory to authenticate a user.
Figure 2:
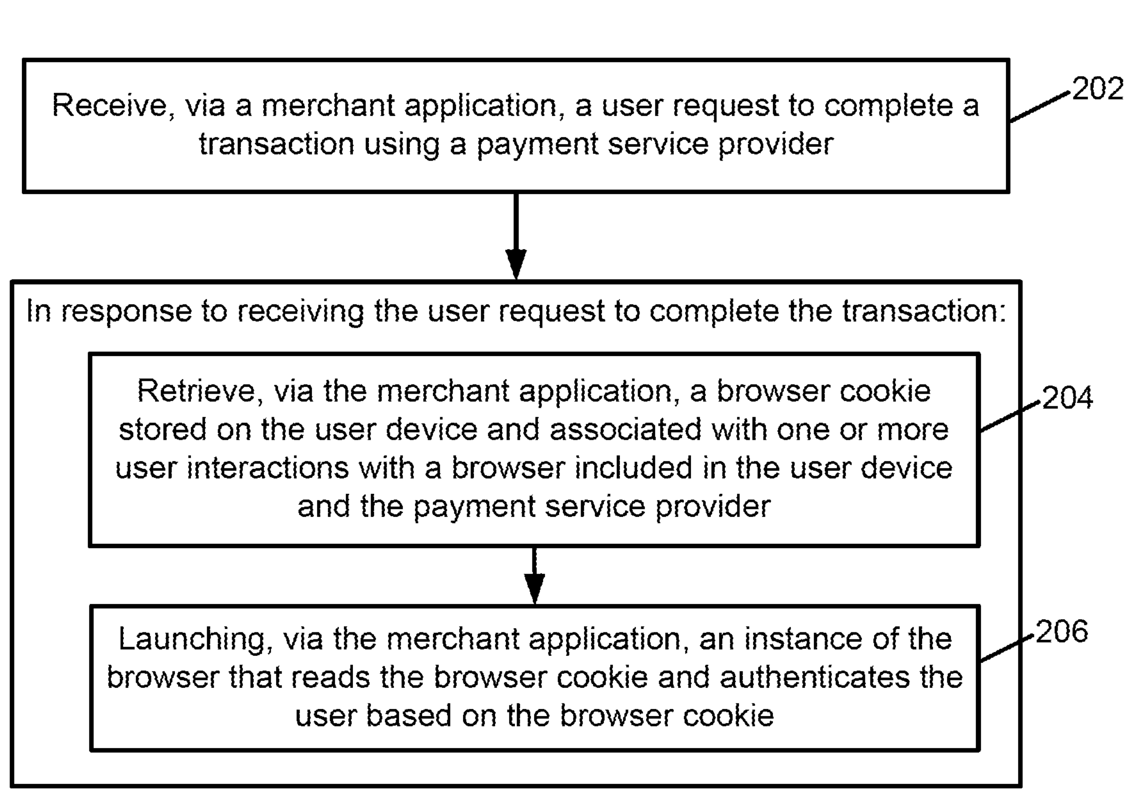

FIG. 2 is a flowchart illustrating an embodiment of a method 200 of a merchant application using a browser cookie stored in the browser memory to authenticate a user. Method 200 is not meant to be limiting and may be used in other applications other than the applications discussed below. Method 200 includes blocks 202, 204, and 206.

In a block 202, a merchant application receives a user request to complete a transaction using a payment service provider. The user may send the request to the merchant application to complete the transaction in a variety of ways. In an example, the merchant application provides a "Checkout with Payment Service Provider" button that if selected by the user sends a request to the merchant application to complete the transaction using the payment service provider (see user selectable option 114 in FIG. 1). In another example, the merchant application provides a "Confirm Payment" button that if selected by the user sends a request to the merchant application to complete the transaction using the payment service provider (see user selectable option 914 in FIG. 9).

In response to receiving the user request to complete the transaction using the payment service provider, blocks 204 and 206 may be executed. In block 204, in response to receiving the user request to complete the transaction using the payment service provider, the merchant application retrieves a browser cookie stored on the user device and associated with one or more user interactions with a browser included in the user device and the payment service provider. A browser cookie is a small text file that allows a website or web application to recognize a particular user and their interaction(s) with the website or web application. The browser cookie may have been previously sent to the browser by a payment provider server operated by the payment service provider and saved by the browser into the browser memory.

Figure 3:
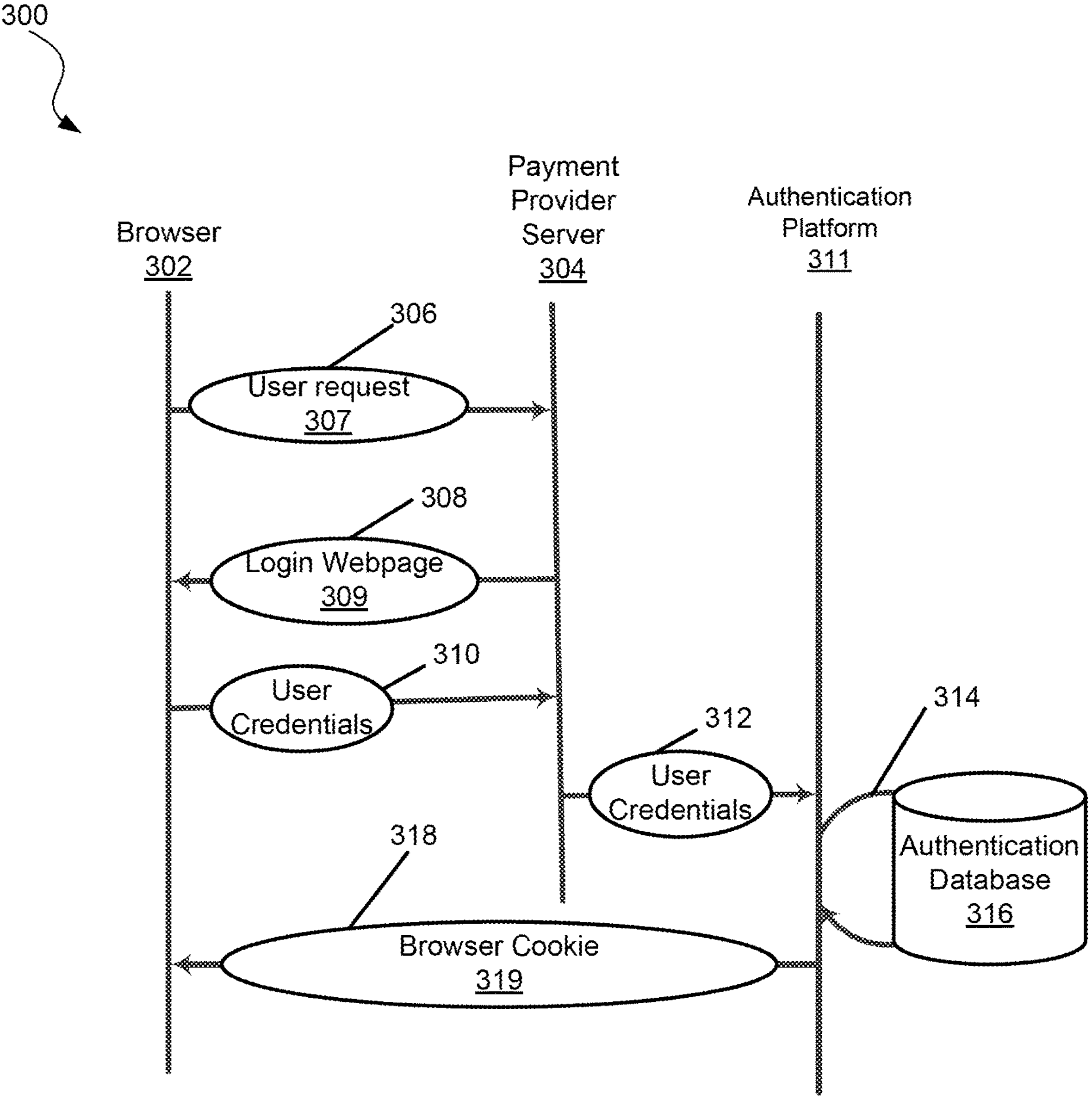
FIG. 3 is an example swim diagram illustrating user interactions that provide a browser with a browser cookie that is later retrieved by the merchant application.
Figure 4:
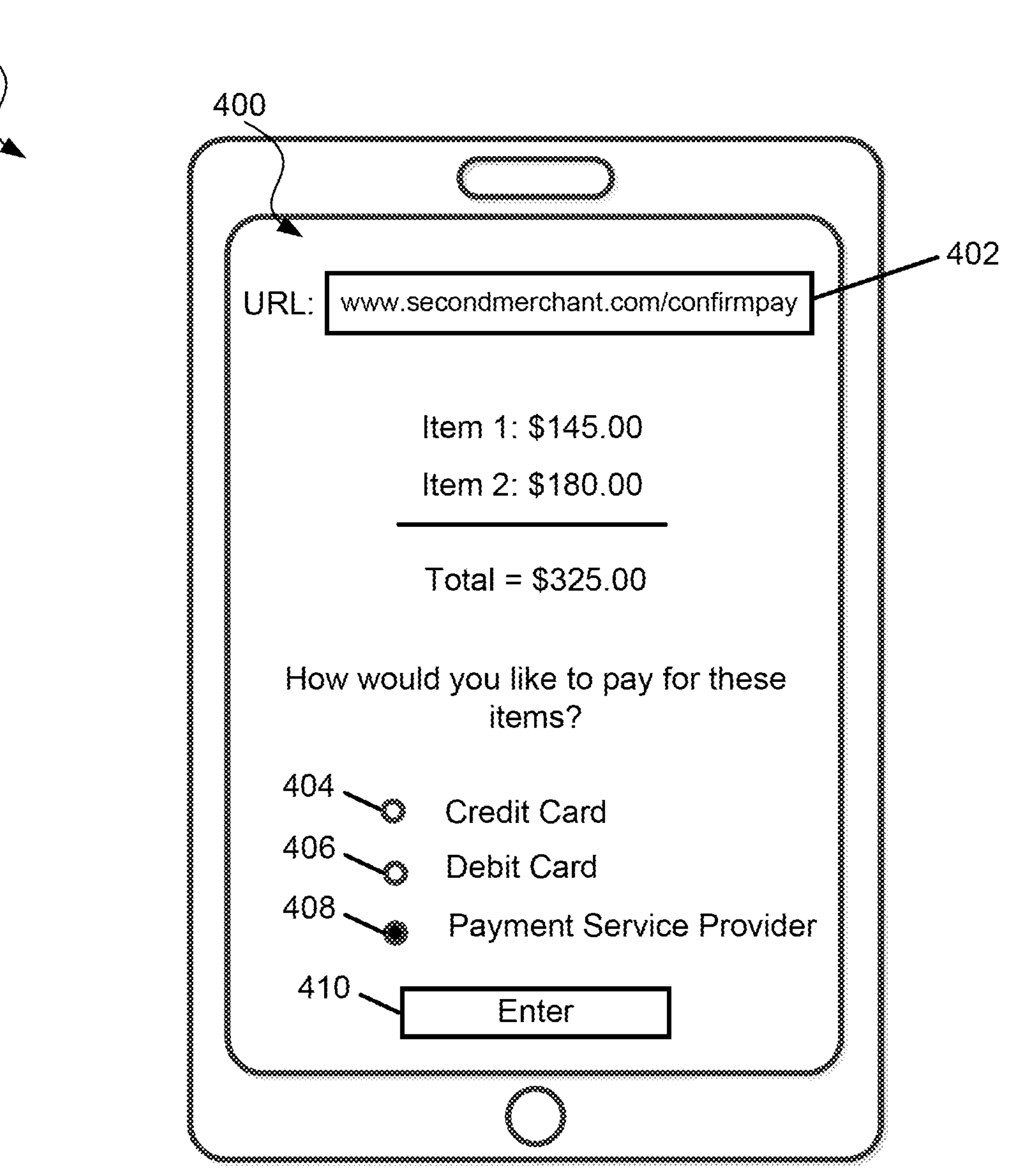
FIG. 4 is an example webpage including a user selectable option that if selected by the user causes the browser to send a user request to complete a transaction using a payment service provider to a payment provider server maintained by the payment service provider.
Figure 5:
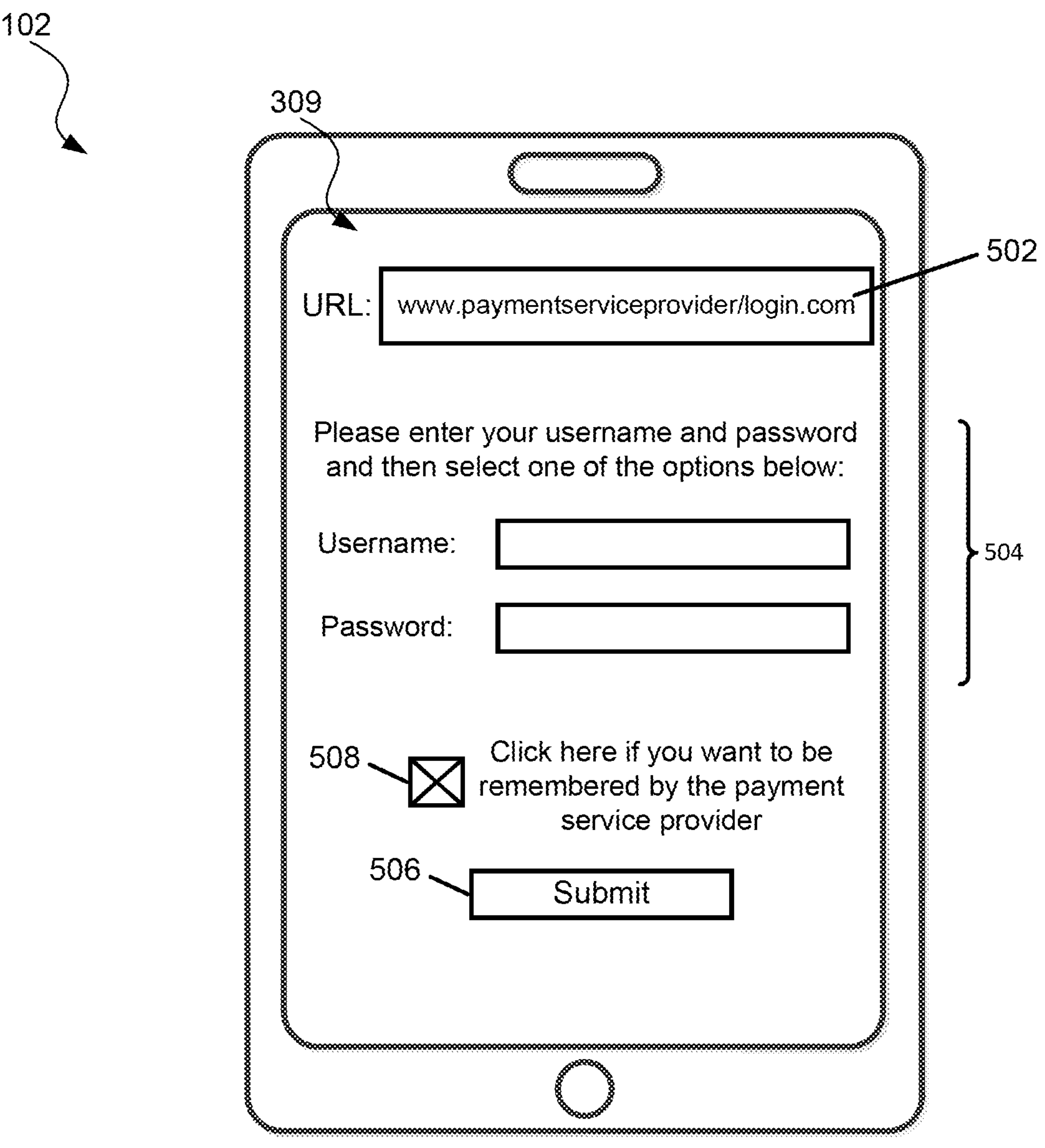
FIG. 5 is an example login webpage that is provided by the payment provider server to the user.

FIGS. 3-5 will be discussed in conjunction with each other to better explain the user's previous interactions with a browser 302 included in the user device and a payment provider server 304. Swim diagram 300 includes actions 306, 308, 310, and 312, which may have occurred before the execution of blocks 202, 204, and 206 in FIG. 2.

FIG. 3 is an example swim diagram 300 illustrating user interactions that provide the browser with the browser cookie that is retrieved by the merchant application in block 204 in FIG. 2. In FIG. 3, at an action 306, browser 302 sends payment provider server 304 a user request 307, which may be a user request to complete a transaction using a payment service provider. The user may be a consumer and may use user device 102 to complete a transaction using payment provider server 304. Payment provider server 304 is a server that is remote from user device 102. Payment provider server 304 may be maintained, for example, by an online payment service provider that provides payment between the user and the merchant that maintains the merchant application. Payment provider server 304 may be maintained by a payment service provider, such as PAYPAL®, Inc. of San Jose, CA. Payment provider server 304 may be configured to interact with user device 102 and/or a merchant that maintains the merchant application over a network to facilitate the purchase of goods or services, communicate/display information, and send payments by the user of user device 102 to a third-party (e.g., the merchant).

It should be understood that payment provider server 304 may represent one or more payment provider servers that are provided by the payment service provider. Although the description may provide examples in which payment provider server 304 performs actions, it should be understood that servers executing on different computing devices may perform these actions. For example, a first payment provider server 304 (e.g., payment provider server 304*a*) may perform a first action and a second payment provider server 304 (e.g., payment provider server 304*b*) may perform a second action.

Browser 302 may send, based on a variety of inputs from the user, user request 307 to payment provider server 304. FIG. 4 is an example webpage 400 including a user selectable option 408 that if selected by the user causes browser 302 to send user request 307 to payment provider server 304. Webpage 400 is a webpage that is controlled by and provided by a second merchant that may be the same as or different from the merchant that controls the merchant application that displays page 100 in FIG. 1. Additionally, the merchant application controlled by the second merchant may be the same as or different from the merchant application that displays page 100 in FIG. 1. Browser 302 may display webpage 400 on a display of user device 102. Payment provider server 304 may send browser 302 webpage 400 for display on user device 102.

Content of webpage 400 is referenced by a URL 402, which is "www.secondmerchant.com/confirmpay," and includes the user's selected item(s) along with the price and various ways for the user to pay for those item(s). For example, webpage 400 includes the option to pay with a credit card via user selectable object 404, debit card via user selectable object 406, or a user account the user has with a payment service provider via user selectable object 408. The user's user account with the payment service provider is linked to one or more methods of payment, which may include the user's credit card, debit card, bank account (e.g., checking account), and/or other forms of payment, etc. to which the user has given the payment provider server permission to access. The user may select one of these options by selecting the appropriate user selectable object and selecting a user selectable object 410, which is labeled "Enter."

If the user selects user selectable object 404 to pay with a credit card, the user may be provided with a prompt to enter credit card information. If the user selects user selectable object 406 to pay with a debit card, the user may be provided with a prompt to enter debit card information. If the user selects user selectable object 408 to pay with a payment account linked to the user's payment service provider user account, the merchant application provided by the second merchant may redirect the user device to payment provider server 304. In response to the user selecting user selectable object 408 shown in webpage 400 in FIG. 4, browser 302 may send user request 307 to payment provider server 304. The user request may also include details of the transaction such as the total amount of the transaction, item(s) purchased, etc. Payment provider server 304 may receive user request 307, which may be a user request to complete the transaction using the payment service provider.

Referring back to FIG. 3, at an action 308, in response to user request 307, payment provider server 304 sends browser 302 a login webpage 309. Browser 302 receives login webpage 309 and displays it on a display of the user device. Before payment provider server 304 allows the user to access resources stored or protected by the payment provider server, it may prompt the user for her user credentials via login webpage 309 and authenticate the user.

FIG. 5 is an example login webpage 309 that is provided by payment provider server 304 to the user device. Payment provider server 304 may provide webpage 309 in response to the user selecting user selectable object 408 to pay with the user's payment account linked to the user's payment service provider user account (see FIG. 4). Webpage 309 is referenced by a URL 502, which is "www.paymentservice-provider/login.com," and is controlled by and provided by the payment service provider. Browser 302 displays webpage 309 on a display of user device 102. Browser 302 initially displayed web content from a second merchant in FIG. 4 and has now transitioned to displaying web content from payment provider server 304 in FIG. 5. In this example, the selection of user selectable option 408 displayed on webpage 400 may redirect browser 302 executing on the user device to point to the payment provider server. Webpage 309 is a login page including a prompt 504 that requests the user to enter her user credentials (e.g., a username and password) into the login webpage for authentication purposes. The user may enter her user credentials into the login webpage and select a user selectable option 506, which is labeled "Submit," to submit her user credentials to the payment provider server for authentication purposes. If the user desires to be remembered by the payment service provider and to opt in for faster payments, the user may select a user selectable option 508. In the example illustrated in FIG. 5, the user has opted to be remembered by the payment service provider. In response to the user selecting user selectable option 508 and user selectable option 506, the payment service provider may "remember" the user and streamline her payment experience, which may include the payment service provider authenticating the user without requesting the user's user credentials. By selecting the selectable option 508, the user may opt into a "one touch" feature provided by the payment service provider, which allows the user to request from a merchant application that a transaction be completed using the payment service provider once and authenticating the user without requesting her user credentials. Accordingly, in some cases, payment provider server 304 provides the user with the ease of not having to remember her user credentials and entering them into a login page provided by the payment provider server 304. Users typically have accounts with multiple websites and opting into the "one touch" feature may provide the user with a more streamlined experience of interacting with merchant applications and purchasing items. Payment provider server 304 may store the user's request to be remembered by storing a refresh token in the browser cookie that is sent to the user device, as will be discussed further below.

Referring back to FIG. 3, at an action 310, browser 302 sends the user's user credentials (e.g., the user credentials entered into webpage 309) to payment provider server 304. Payment provider server 304 receives the user's user credentials and may proceed to perform actions to authenticate the user. The payment provider server may include or interact with an authentication platform 311 that receives the user's user credentials and determines, based on the entered user credentials, whether the user has been successfully authenticated. At an action 312, payment provider server 304 sends the user credentials to authentication platform 311. At an action 314, authentication platform 311 searches an authentication database 316 that stores user credentials (e.g., usernames and passwords) that have been registered with the payment service provider. In an example, authentication platform 311 makes a call to/v1/OAuth/login in order to effectively login the user and obtain an access token. Parameters of the call may include the user's login credentials.

At an action 318, if authentication platform 311 successfully authenticates the user, authentication platform 311 sends a browser cookie 319 to browser 302. A browser cookie is a small text file that allows a website or web application to recognize a particular user and their interaction(s) with the website or web application. Accordingly, if payment provider server 304 or another payment provider server that is operated by the payment service provider receives browser cookie 319 at a later point in time, the payment provider server may recognize the user and identify her information. In some examples, browser cookie 319 is a data file that stores session information regarding the user's interactions with the payment provider server (e.g., the transaction along with its details), the user's preferences, and/or a refresh token. The refresh token provides an expiration date for the browser cookie (e.g., 60 days from date of issuance). In some examples, the refresh token is encrypted.

A refresh token represents the authorization granted to the client by payment provider server 304. In some embodiments, the refresh token may be a string. The string may be opaque to the client. The refresh token is a representation of the logged-in user and in some examples may be a credential used to obtain an access token. The refresh token denotes an identifier used to retrieve the authorization information. In some examples, the refresh token is issued to the client by authentication platform 311 and is used to obtain one or more new access tokens when the current access token becomes invalid or expires, or to obtain additional access tokens with identical or narrower scope. For example, access tokens may have a shorter lifetime and fewer permissions than authorized by the payment provider server 304. Authentication platform 311 may generate the access token without requesting the user to enter the user's user credentials.

Authentication platform 311 may perform additional checks before generating and sending an access token to the user device. In some examples, browser cookie 319 includes an indication that the user has opted into the "one touch" feature provided by the payment service provider. In an example, browser cookie 319 includes a refresh token, which indicates that the user has opted into the "one touch" feature. In some examples, refresh token 622 is passed along with a request for one or more authorization scopes (e.g., valid access to downstream services) to authentication platform 311. Authentication platform 311 may check for the validity of refresh token 622 (e.g., if the refresh token has not yet expired) and if each of one or more the authorization scopes can be granted on the refresh token, authentication platform 311 sends an access token to the user device. The access token may then be passed to a resource server (e.g., payment provider server 304) to request one or more resource(s) from the resource server. In this example, without a valid access token, the request to the resource server fails.

Browser 302 receives browser cookie 319 and stores it in a browser memory on the user device. In some examples, payment provider server 304 and authentication platform 311 are included and executed in the same computing device. For example, authentication platform 311 may be incorporated in payment provider server 304. In some examples, payment provider server 304 and authentication platform 311 execute on different computing devices.

In some examples, authentication platform 311 may include a secure token service. If the user has been successfully authenticated, the secure token service may generate an access token and provide it to the user device. The secure token service may provide an inspection and validation of browser cookies based on policies and may drive the assessment of browser cookies (e.g., refresh tokens, etc.) to determine whether they are sufficient for a login. An access token is a data object by which a client authenticates to a resource server (e.g., payment provider server 304) and lays claim to authorizations for accessing particular resources. For example, the user device may use an access token generated by the payment provider server to access a resource (e.g., user account and payment account information) provided by the payment provider server. The payment provider server may then provide the user device with an authenticated session and complete the transaction.

Payment provider server 304 may provide the user device with a refresh token that is used to keep the user logged into the payment provider service system. In an example, the payment provider server generates a refresh token and provides the user device with a browser cookie that includes the refresh token. The browser cookie may have an expiration date (e.g., 60 days from the date of issuance). As long as the browser cookie has not yet expired, the user may perform other transactions (e.g., payments via the payment provider server) without having to login and provide her user credentials.

The user device may receive the browser cookie and store the browser cookie including the refresh token into the browser memory. The refresh token keeps the user "alive" across refreshes and across webpages as long as the browser cookie has not yet expired. The browser cookie that is placed in the browser memory allows a secure token service to determine scenarios where a full login (e.g., entering user credentials) can be skipped. Accordingly, it is this browser cookie sent from payment provider server 304 to browser 302 that the merchant application that provides page 100 in FIG. 1 may retrieve from the browser memory in response to later requests by the user to complete a transaction using the payment service provider. The browser cookie that is retrieved by the merchant application can be used to authenticate the user, without requesting the user to enter her login credentials.

Alternatively, if the user has not been successfully authenticated based on the user credentials, payment provider server 304 send a message indicating that the user has not been successfully authenticated to the user device. In an example, payment provider server 304 may send this message to browser 302 for display on the user device along with a prompt for the user to enter her user credentials again.

Although in the example illustrated in FIG. 3, browser 302 is shown as sending user request 307 and the user credentials entered into login webpage 309 to payment provider server 304, this is not intended to be limiting and it should be understood that a mobile application installed on user device 102 may perform these actions. In this example, the mobile application may point to payment provider server 304 and interact with the payment provider server 304 to perform actions 306 and 310. If the user is successfully authenticated, authentication platform 311 may send browser cookie 319 to user device 102. Browser 302 may receive browser cookie 319 and store it in the browser memory for later retrieval by browser 302 or a mobile application installed on user device 102.

In an example, a merchant application passes control to an associated Software Development Kit (SDK) provided by the payment service provider to retrieve the browser cookie. An SDK includes a set of tools and platform components (e.g., set of software libraries) for developers to develop, build, test, debug, and optimize their applications, and manage the platform component installation. The SDK may also provide easy ways to integrate with the build and development environments. In an example, the SDK is PAYPAL TOUCH®, available from PAYPAL® Inc., of San Jose, CA, and the payment service provider is PAYPAL®, Inc. of San Jose, CA. However, a variety of entities may provide the SDK and operate as the payment service provider.

An SDK may be provided by a payment service provider to the merchant that maintains the merchant application. The merchant may incorporate the SDK into the merchant application during the building of the application. In an example, if a user downloads the merchant application on a user device, the SDK may also be downloaded with (or as part of) the merchant application on the user device. As such, when the user selects the merchant application by, for example, selecting an icon associated with the merchant application, the merchant application (along with the SDK) is launched. In another example, the SDK may be part of an application that is trusted by the payment provider server and that interacts with the merchant application on the user device. In such an example, the user may download the SDK independent of the merchant application for execution on the user device.

The SDK communicates with a payment provider server (e.g., payment provider server 304) operated by the payment service provider and sends information to and receives information from the payment provider server. In an example, the SDK and the payment provider server may communicate with each other to authenticate the user. In some examples, the SDK provides the user selectable option (e.g., user selectable option 114, which is labeled "Checkout with Payment Service Provider)" that if selected causes the merchant application to retrieve the browser cookie associated with one or more user interactions with browser 302 and the payment service provider.

The user device may include a plurality of merchant applications, each of which may incorporate the SDK from the payment service provider. Accordingly, any one of these merchant applications may access the browser cookie stored in the browser memory and perform actions to authenticate the user.

Referring back to FIG. 2, in block 206, in response to the user request to complete the transaction using the payment service provider, the merchant application launches an instance of the browser that reads the browser cookie and authenticates the user based on the browser cookie. In some examples, in response to receiving the user request to complete the transaction using the payment service provider, the merchant application causes a browser instance to be launched on the user device and provides the browser instance with the browser cookie retrieved from the browser memory. The browser instance may be an instance of a browser that is installed on the user device, may include features of the browser, and may share browser cookies and other website data with the browser. In some examples, the user's activity and interaction with the browser instance are not visible to merchant application(s). In an example, merchant application(s) cannot access the user's browsing history or website data.

It should be understood that additional processes may be performed before, during, or after blocks 202, 204, and/or 206 discussed above. It is also understood that one or more of the blocks of method 200 described herein may be omitted, combined, or performed in a different sequence as desired.

Figure 6:
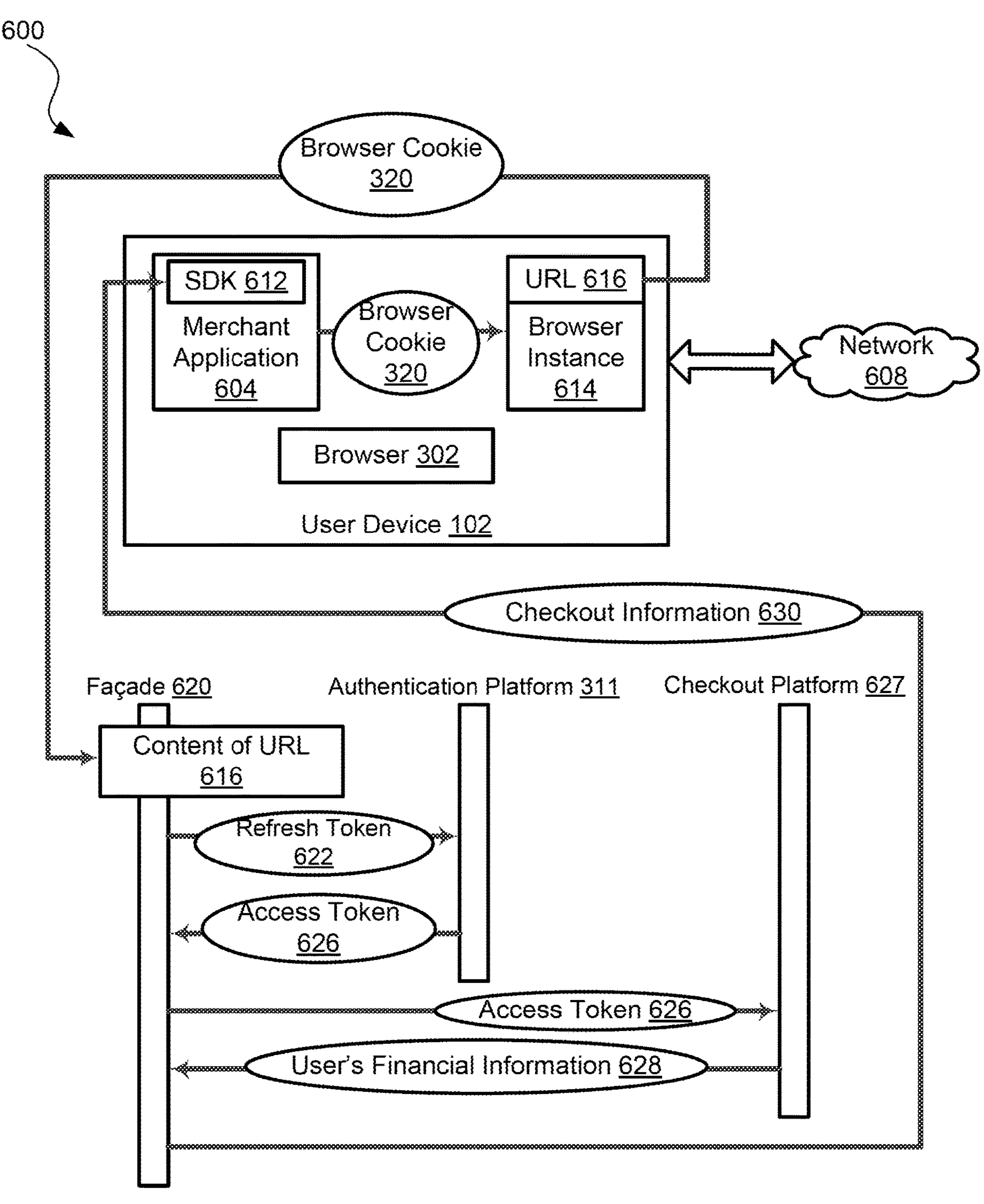
FIG. 6 is an example process flow of a networked system configured to implement a process for authenticating a user.

FIG. 6 is an example process flow of a networked system 600 configured to implement a process for authenticating a user. Networked system 600 may include or implement a plurality of servers and/or software components that operate to authenticate a user and/or perform various payment transactions or processes. Exemplary servers may include, for example, stand-alone and enterprise-class servers operating a server operating system (OS) such as a MICROSOFT® OS, a UNIX® OS, a LINUX® OS, or other suitable server-based OS. It can be appreciated that the server(s) may be deployed in other ways and that the operations performed and/or the services provided by such a server may be combined or separated for a given implementation and may be performed by a greater number of servers. One or more servers may be operated and/or maintained by the same or different entities.

FIG. 6 includes user device 102 coupled to a network 608. Network 608 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

User device 102 includes browser 302, a merchant application 604, and a browser cookie 319. In the example illustrated in FIG. 6, merchant application 604 may be installed on user device 102. The user may have downloaded merchant application 604 on user device 102 or may have received this application already downloaded on user device 102. Merchant application 604 may be maintained, for example, by a merchant or seller offering various products and/or services. The merchant may be a participating merchant who has a merchant account with the payment service provider. Generally, a merchant server may be maintained by anyone or any entity that receives money, which includes charities as well as retailers and restaurants. For example, a purchase transaction may be a donation to charity.

In some examples, user device 102 is a mobile device (e.g., smartphone or computing tablet), and the user downloads one or more mobile applications onto the mobile device. A mobile application may be a merchant application that communicates with a merchant server. In an example, user device 102 is an ANDROID® device that is installed with the ANDROID® mobile OS. A mobile application is a software program that may be downloaded and accessed directly via the mobile device. A mobile application may be represented by an icon on a display of user device 102, and the user may select the mobile application by touching a location on the display of the device corresponding to the icon (e.g., double tapping the icon) to access and interact with the mobile application. In some examples, user device 102 is a desktop computer, and the user points the browser executing on the desktop computer to a merchant server in order to retrieve webpages controlled by the merchant or points the browser to a payment provider server in order to retrieve webpages controlled by the payment service provider.

Merchant application 604 includes an SDK 612. Although user device 102 is illustrated as including two applications (e.g., merchant application 604 and browser 302), this is not intended to be limiting and user 102 may include more than two applications. For example, user device 102 may include another merchant application that also includes SDK 612. Additionally, although the description may provide examples of merchant application performing particular actions, it should also be understood that SDK may perform these particular actions. Browser 302 may receive browser cookie 319 from payment service provider 304 as discussed relative to FIG. 3 and store the browser cookie into the browser memory. As discussed above relative to FIG. 2, in response to a user request to complete a transaction using the payment service provider, merchant application 604 may retrieve browser cookie 319 and launch an instance 614 of browser 302. Merchant application 604 may provide browser cookie 319 to browser instance 614, which reads the browser cookie and authenticates the user based on the browser cookie.

Browser instance 614 may be loaded with a reference to content (e.g., uniform resource locator (URL)). The reference may point to resources stored at payment provider server 304. In the example illustrated in FIG. 6, merchant application 604 (or SDK 612) launches browser instance 614 that references a URL 616 hosted by payment provider server 304 or another payment provider server operated by the payment service provider. Merchant application 604 may pass payment details of the transaction (e.g., item(s) and/or and total amount of transaction) and browser cookie 608 to browser instance 614 for authenticating the user.

URL 616 may reference a façade 620, which includes a web application hosted by the payment service provider and stores content of URL 616. Façade 620 may read browser cookie 319 and determine whether it includes a refresh token 622. If browser cookie 319 does not include a refresh token, then façade 620 may redirect the user to login webpage 309 (see FIG. 5). If browser cookie 319 does not include a refresh token, the user may have indicated to the payment service provider that the user does not wish to opt into the "one touch" feature. In this example, the user may desire to provide her user credentials to the payment service provider before accessing resources of the payment service provider (rather than being authenticated based on the browser cookie).

If browser cookie 319 includes refresh token 622, façade 620 may send the refresh token to authentication platform 311. Authentication platform 311 determines whether refresh token 622 is valid. Authentication platform 311 may determine that refresh token 622 is valid if the browser cookie associated with the refresh token has not yet expired. Conversely, authentication platform 311 may determine that refresh token 622 is not valid if the browser cookie associated with the refresh token has expired. In response to determining that refresh token 622 is not valid, authentication platform 311 may redirect the user to login webpage 309 (see FIG. 5). In response to determining that refresh token 622 is valid, authentication platform 311 generates an access token 626 and sends the access token to façade 620.

Façade 620 may receive access token 626 and send it to a checkout platform 627 that stores the user's financial information associated with the payment service provider. For example, the user's financial information may be associated with a user account the user has with the payment service provider. Access token 626 may allow the user to access the services of the payment service provider to complete a transaction. Checkout platform 627 searches a database, identifies the user's financial information 628, and sends the user's financial information 628 to façade 620. Façade 620 receives the user's financial information 628 and provides checkout information 630 to user device 102. SDK 612 may receive checkout information 630 and renders the appropriate checkout information on a display of user device 102.

Figure 7:
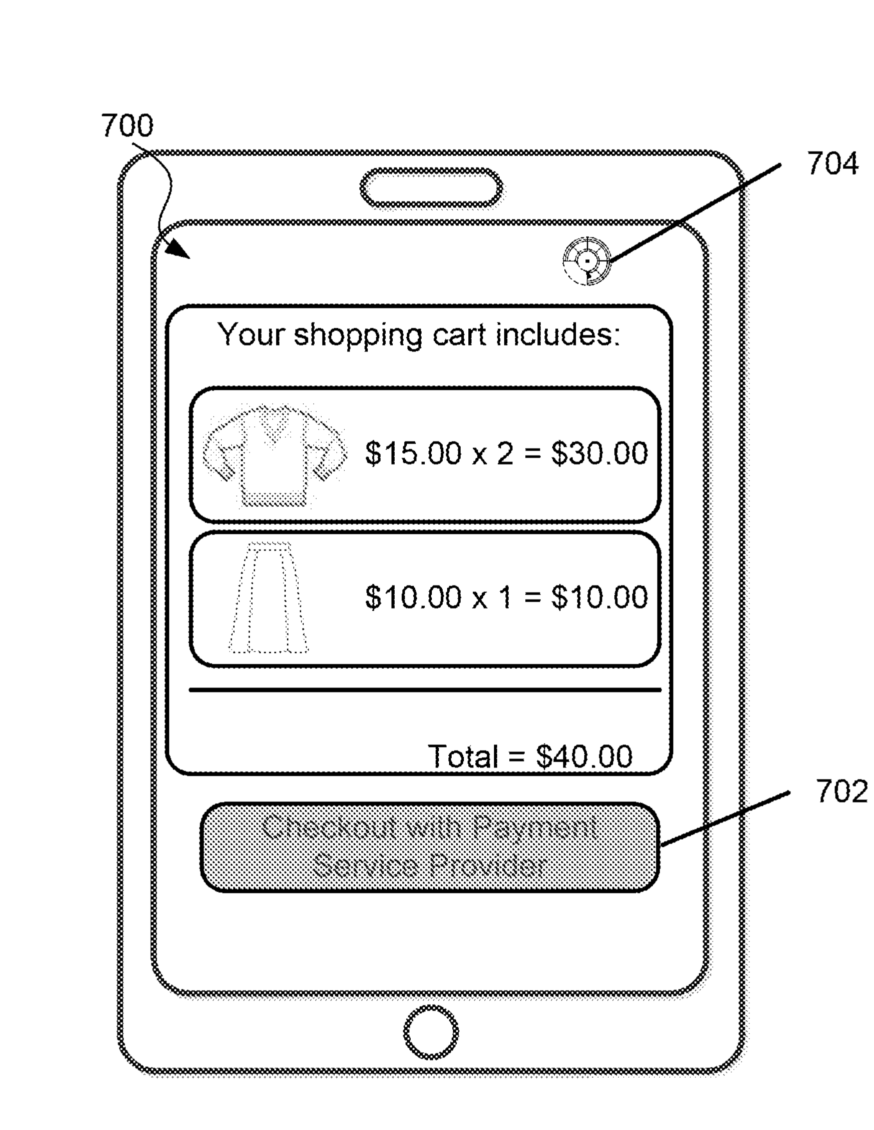
FIG. 7 is an example page that is provided by the merchant application to the user.

In some examples, browser instance 614 is transparent and authenticates the user in the foreground. FIG. 7 is an example page 700 that is displayed by merchant application 604 on a display of user device 104, with browser instance 614 being transparent. Browser instance may be displayed on page 700, but not viewable by the user. Page 700 includes a non-user selectable option 702, which is labeled "Checkout with Payment Service Provider" and corresponds to user selectable option 114 in FIG. 1 that was selected by the user. In page 700, non-user selectable option 702 is "grayed out" and is not selectable by the user. In some examples, the merchant application is displayed on a display coupled to user device 102, and an icon 704 indicating that additional processing is being performed by the user device is displayed in the merchant application. Icon 704 may indicate to the user that some processing is being performed by the user device based on the user selection of user selectable option 114 in FIG. 1. The merchant application may display icon 704 on the display of the user device, while actions are being performed by browser instance and the payment provider server to authenticate the user. In this example, the user device may continue to display page 700 while the example actions in FIG. 6 are being performed. Content may continue to be displayed on the display while the user is being authenticated by the payment service provider. Accordingly, it may appear that merchant application 604 is performing actions to process the transaction with the payment service provider and the processing is happening within the merchant application.

Figure 8:
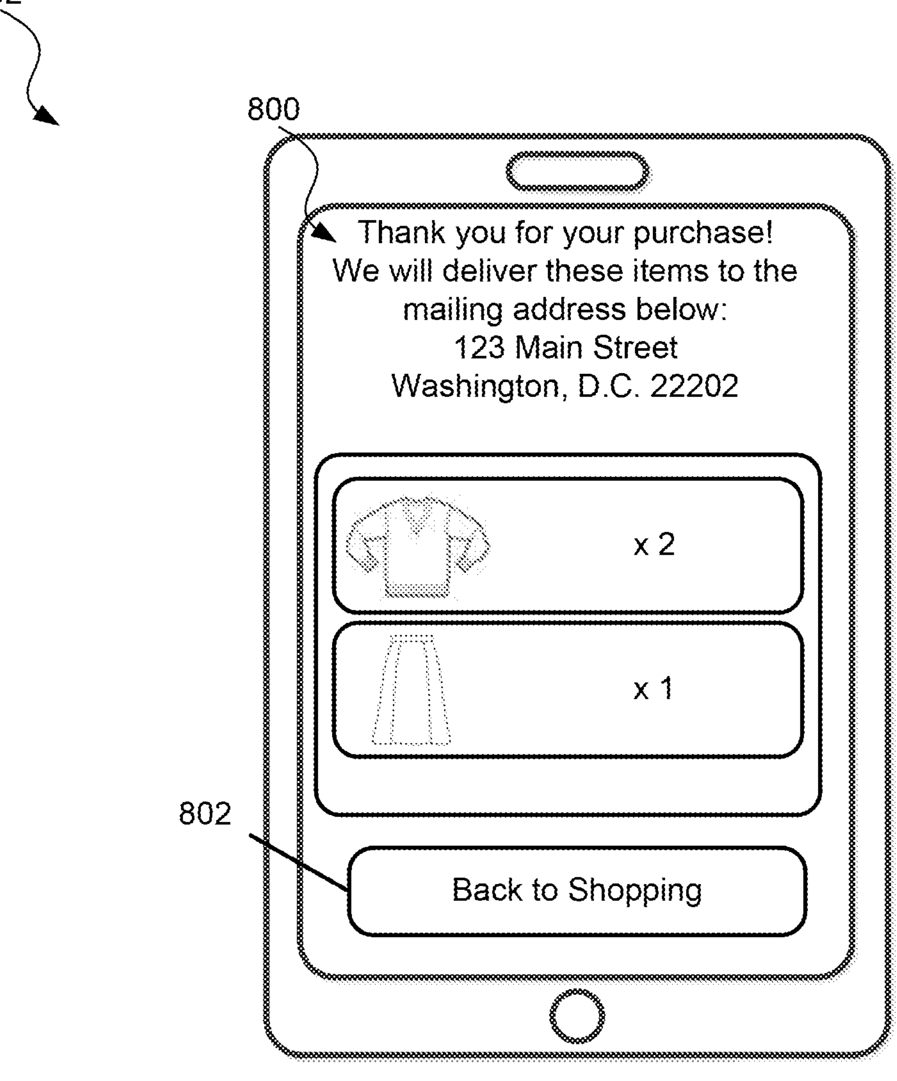
FIG. 8 is another example page that is provided by the merchant application to the user.

FIG. 8 is an example page 800 that is provided by merchant application 604 to the user. Page 800 includes the text "Thank you for your purchase! We will deliver these items to the mailing address below: 123 Main Street Washington, D.C. 22202" along with images of the items the user purchased in the transaction. Page 800 also includes a user selectable option 802, which is labeled "Back to Shopping," that if selected provides the user with other items that the user may place into her electronic shopping cart and eventually purchase. Accordingly, the user may request to complete another transaction using the payment service provider by selecting user selectable option 114 to checkout with the payment service provider (see FIG. 1).

User device 102, façade 620, authentication platform 311, and checkout platform 627 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 608. Network 608 may be implemented as a single network or a combination of multiple networks. For example, in various embodiments, network 608 may include the Internet or one or more intranets, landline networks, wireless networks, and/or other appropriate types of networks.

User device 102 may be implemented using any appropriate hardware and software configured for wired and/or wireless communication over network 608. For example, in one embodiment, the user device may be implemented as a personal computer (PC), a smart phone, wearable device, laptop computer, and/or other types of computing devices capable of transmitting and/or receiving data, such as an IPAD® from APPLE® or an ANDROID® smartphone. Trademarks are the property of their respective owners.

User device 102 also may include other applications to perform functions, such as email, texting, voice and instant messaging (IM) applications that allow the user to send and receive emails, calls, and texts through network 608, as well as applications that enable the user to communicate, transfer information, make payments, and otherwise use a smart wallet through the payment service provider.

Figure 9:
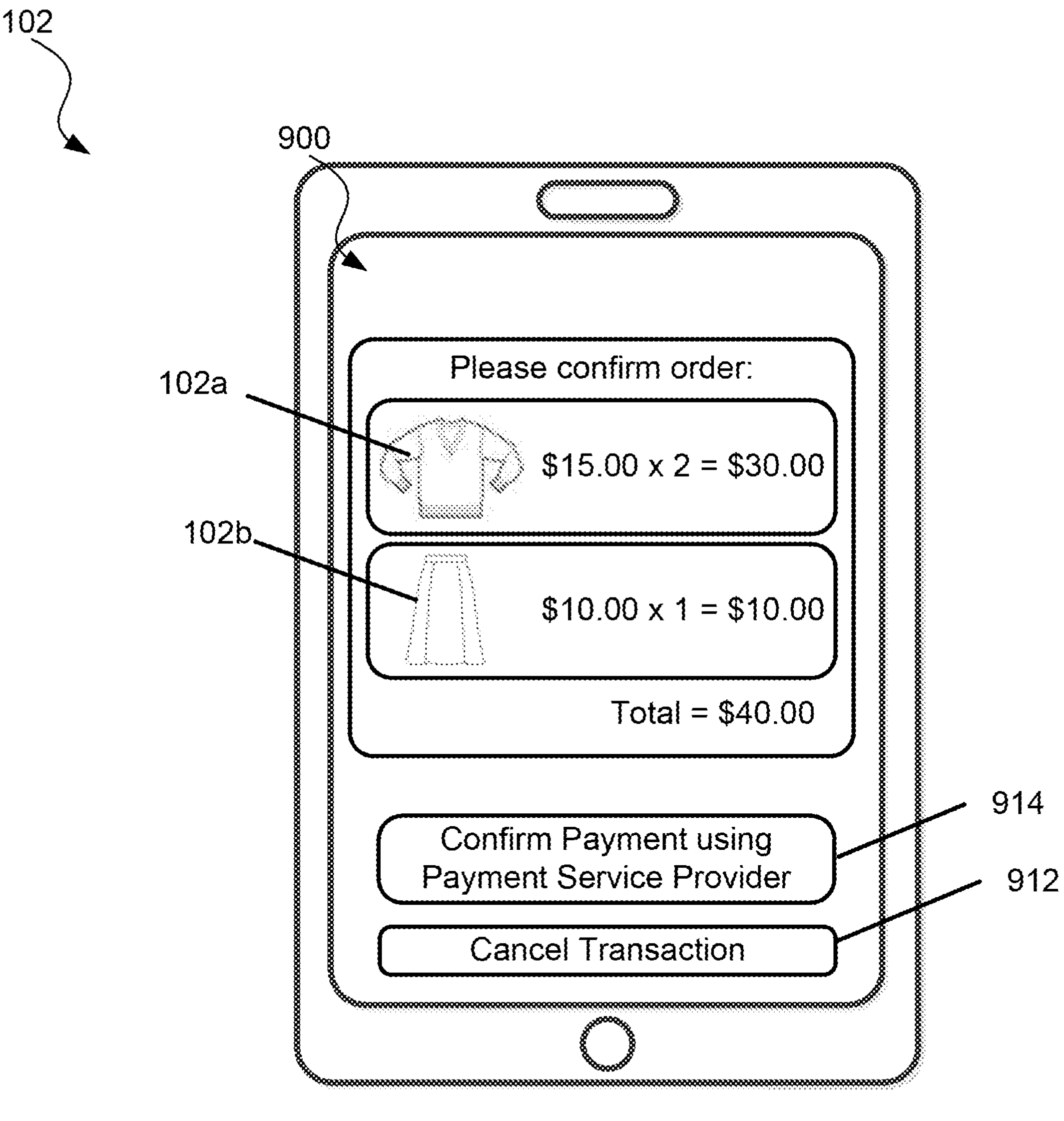
FIG. 9 is an example webpage including a user selectable option that if selected by the user causes the browser to send a user request to complete a transaction using the payment service provider to the payment provider server.

It should be understood that various actions by the user may send a user request to complete a transaction using a payment service provider to payment provider server 304 (see block 202 in FIG. 2). FIG. 9 is an example page 900 that is displayed by a merchant application on a display of user device 102. Page 900 includes content that may be controlled and provided by a merchant. In the example illustrated in FIG. 9, page 900 includes items **102*a* and 102*b* that are provided by the merchant and is a confirmation page that requests the user to confirm her order. Additionally, page 900 includes user selectable options that if selected by the user causes the merchant application to send a user request to complete a transaction using a payment service provider to a payment provider server. In some examples, the same merchant application that displays page 100 in FIG. 1 also displays page 900 in FIG. 9. For example, the merchant application may display page 900 in response to the user selecting user selectable option 114**.

Page also includes a user selectable option 912, which is labeled "Cancel Transaction," and a user selectable option 914, which is labeled "Confirm Payment using Payment Service Provider." The user may select user selectable option 912 to cancel the transaction. In response to the user selecting user selectable option 912, the merchant application may remove all items from the user's electronic shopping cart. The user may then proceed to place items into her electronic shopping cart. Alternatively, the user may select user selectable option 914 to confirm payment using the payment service provider and complete the transaction. In response to the user selecting user selectable option 914, the merchant application may receive the user's request to complete a transaction using the payment service provider (see block 202 in FIG. 2). Process flow may then continue to blocks 204 and 206 in FIG. 2.

Figure 10:
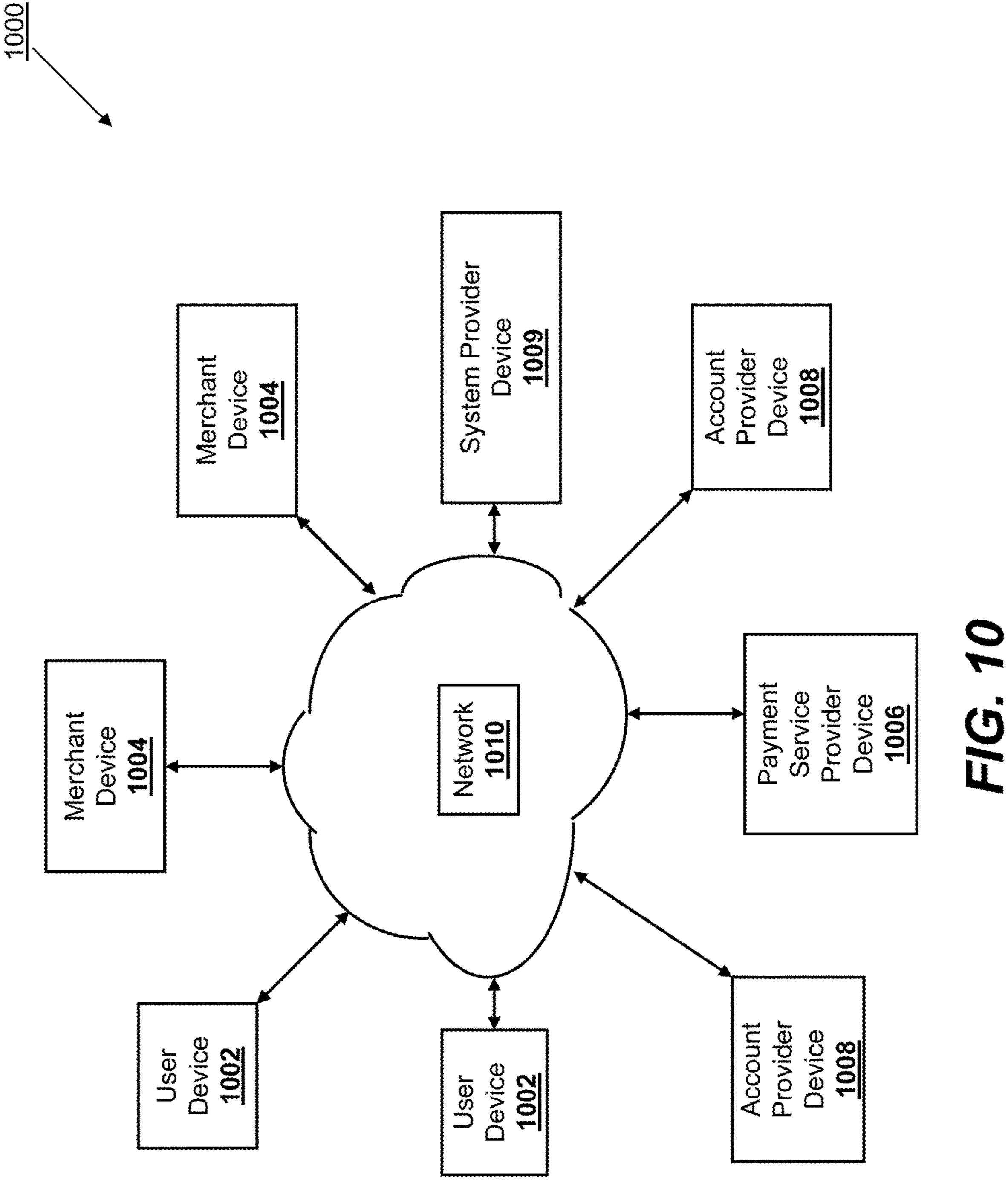
FIG. 10 is a schematic view illustrating an embodiment of a networked system.

Referring now to FIG. 10, an embodiment of a network-based system 1000 for implementing one or more processes described herein is illustrated. As shown, network-based system 1000 may include or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes a plurality of user devices 1002, a plurality of merchant devices 1004, a payment service provider device 1006, a plurality of account provider devices 1008, and/or a system provider device 1009 in communication over a network 1010. Any of the user devices 1002 may be the user devices, discussed above (e.g., user device 102), and may be operated by the users discussed above. The merchant devices 1004 may be the merchant devices discussed above and may be operated by the merchants discussed above. The payment service provider device 1006 may be the payment service provider devices discussed above and may be operated by a payment service provider such as, for example, PayPal® Inc. of San Jose, CA. The account provider devices 1008 may be the account provider devices discussed above and may be operated by the account providers discussed above such as, for example, credit card account providers, bank account providers, savings account providers, and a variety of other account providers known in the art. The system provider device 1009 may be the system provider devices discussed above and may be operated by the system providers discussed above.

The user devices 1002, merchant devices 1004, payment service provider device 1006, account provider devices 1008, and/or system provider device 1009 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The user devices 1002 may be implemented using any appropriate combination of hardware and/or software configured for wired and/or wireless communication over network 1010. For example, in one embodiment, the user devices 1002 may be implemented as a personal computer of a user in communication with the Internet. In other embodiments, the user devices 1002 may be a smart phone, personal digital assistant (PDA), laptop computer, and/or other types of computing devices. The user devices 1002 may include one or more browser applications which may be used, for example, to provide a convenient interface to permit the user to browse information available over the network 1010. For example, in one embodiment, the browser application may be implemented as a web browser (e.g., browser 302) configured to view information available over the Internet. The user devices 1002 may also include one or more toolbar applications which may be used, for example, to provide user-side processing for performing desired tasks in response to operations selected by the user. In one embodiment, the toolbar application may display a user interface in connection with the browser application.

The user devices 1002 may further include other applications as may be desired in particular embodiments to provide desired features to the user devices 1002. In particular, the other applications may include a payment application for payments assisted by a payment service provider through the payment service provider device 1006. The other applications may also include security applications for implementing user-side security features, programmatic user applications for interfacing with appropriate application programming interfaces (APIs) over the network 1010, or other types of applications. Email and/or text applications may also be included, which allow the user to send and receive emails and/or text messages through the network 1010. The user devices 1002 may include one or more user and/or device identifiers which may be implemented, for example, as operating system registry entries, cookies associated with the browser application, identifiers associated with hardware of the user devices 1002, or other appropriate identifiers, such as a phone number. In one embodiment, the user identifier may be used by the payment service provider device 1006 and/or account provider devices 1008 to associate the user with a particular account as further described herein. For example, checkout platform 627 stores the user's financial information.

The merchant devices 1004 may be maintained, for example, by a conventional or on-line merchant, conventional or digital goods seller, individual seller, and/or application developer offering various products and/or services in exchange for payment to be received conventionally or over the network 1010. In this regard, the merchant devices 1004 may include a database identifying available products and/or services (e.g., collectively referred to as items) which may be made available for viewing and purchase by the user.

The merchant devices 1004 may also include a checkout application which may be configured to facilitate the purchase by the payer of items. The checkout application may be configured to accept payment information from the user through the user devices 1002, the account providers through the account provider devices 1008, and/or from the payment service provider through the payment service provider device 1006 over the network 1010. In some examples, the checkout application provides user selectable options displayed on a screen of the user device 1002. If the user selects one of these user selectable options, the merchant application receives a user request to complete a transaction using a payment service provider (see block 202 in FIG. 2).

Figure 11:
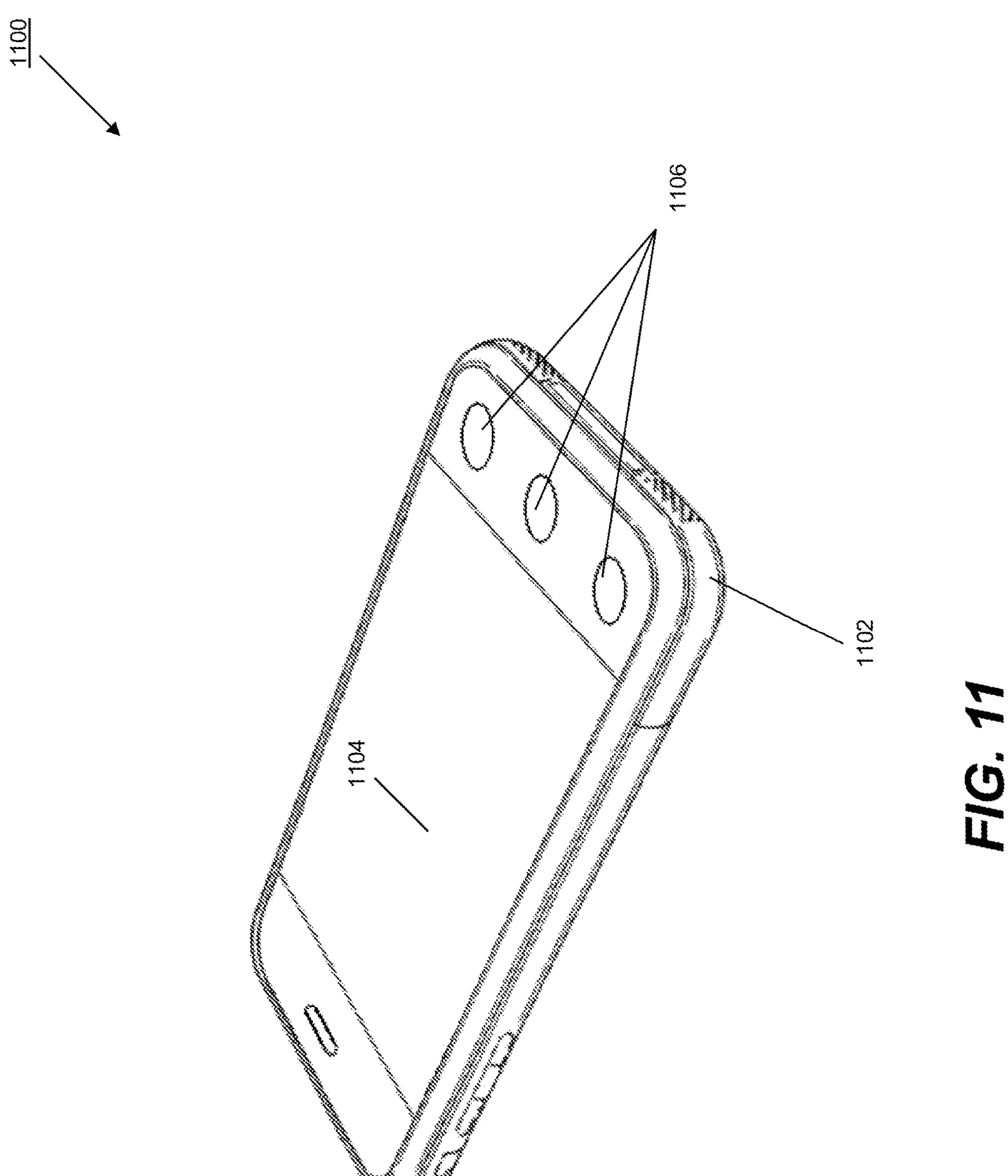
FIG. 11 is a perspective view illustrating an embodiment of a user device.

Referring now to FIG. 11, an embodiment of a user device 1100 is illustrated. The user device 1100 may be any of the user devices discussed above. The user device 1100 includes a chassis 1102 having a display 1104 and an input device including the display 1104 and a plurality of input buttons 1106. Pages of content may be displayed by a merchant application or browser 302 on display 1104. One of skill in the art will recognize that the user device 1100 is a portable or mobile phone including a touch screen input device and a plurality of input buttons that allow the functionality discussed above with reference to methods 200 and/or one or more actions described in FIG. 3 or the example process flow in FIG. 6. However, a variety of other portable/mobile user devices and/or desktop user devices may be used in the methods discussed above without departing from the scope of the present disclosure.

Figure 12:
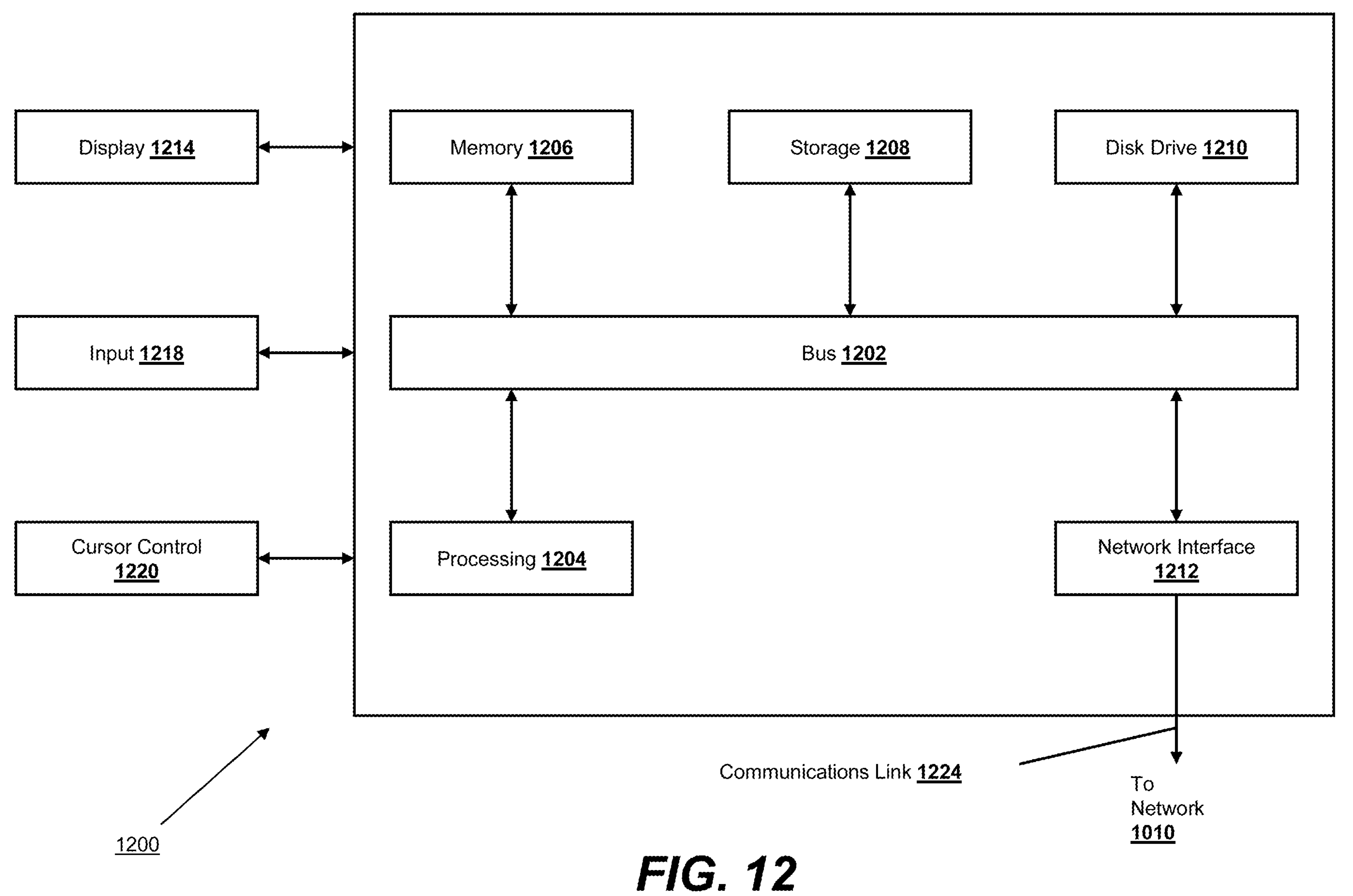
FIG. 12 is a schematic view illustrating an embodiment of a computer system.

Referring now to FIG. 12, an embodiment of a computer system 1200 suitable for implementing, for example, the user devices, the merchant devices, the payment service provider device, the account provider devices, and/or the system provider device is illustrated. It should be appreciated that other devices utilized by users, merchants, payment service providers, account providers, and/or system providers in the payment system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), and/or a cursor control component 1220 (e.g., mouse, pointer, or trackball). In one implementation, the disk drive component 1210 may include a database having one or more disk drive components.

In accordance with embodiments of the present disclosure, the computer system 1200 performs specific operations by the processor 1204 executing one or more sequences of instructions contained in the memory component 1206, such as described herein with respect to the user devices, the merchant devices, the payment service provider device, the account provider devices, and/or the system provider device. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that include the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communications link 1224 to the network 1210 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communications link 1224 and the network interface component 1212. The network interface component 1212 may include an antenna, either separate or integrated, to enable transmission and reception via the communications link 1224. Received program code may be executed by processor 1204 as received and/or stored in disk drive component 1210 or some other non-volatile storage component for execution.

Figure 13:
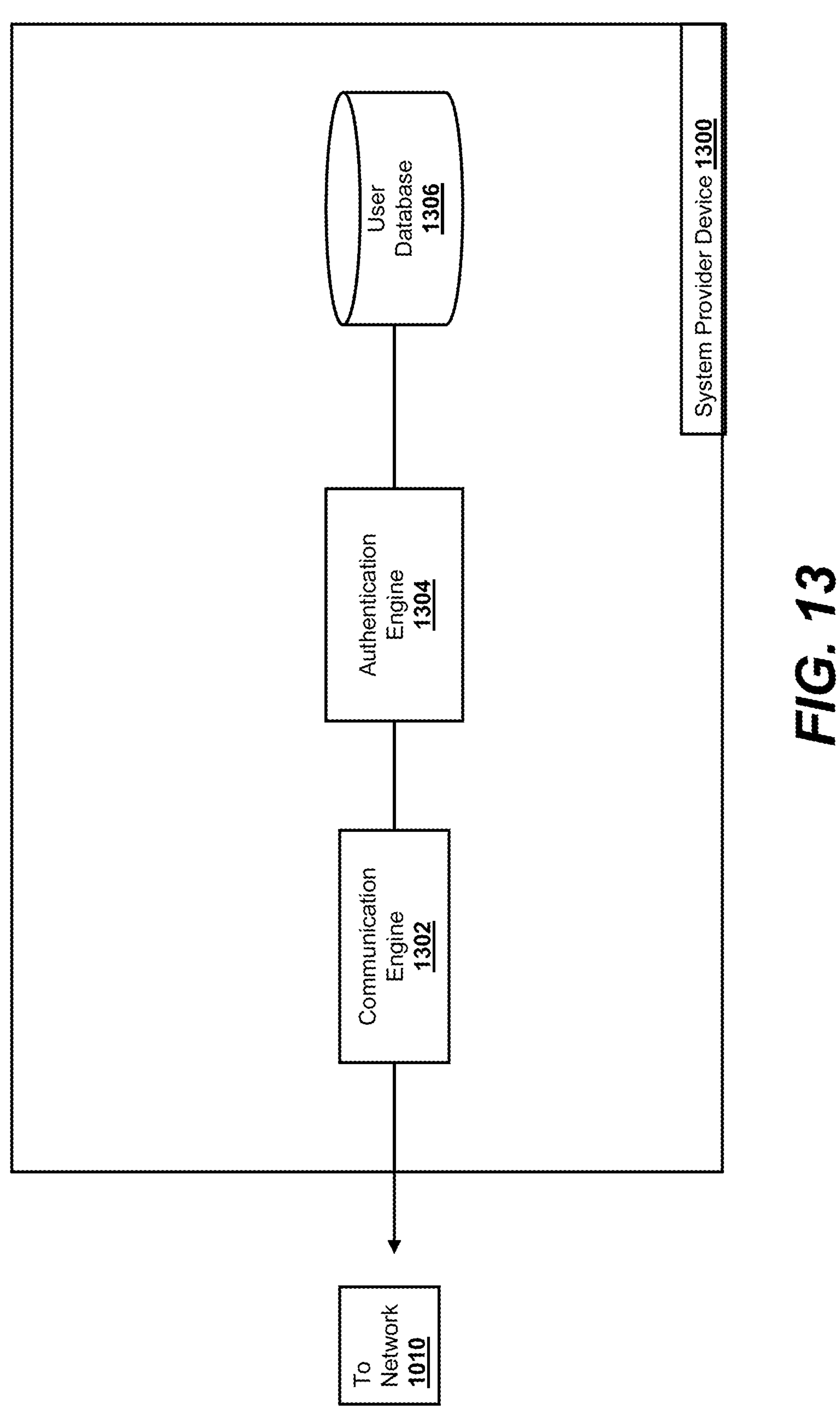
FIG. 13 is a schematic view illustrating an embodiment of a system provider device.

Referring now to FIG. 13, an embodiment of a system provider device 1300 is illustrated. In an embodiment, the device 1300 may be the user devices, the merchant devices, the payment service provider device, the account provider devices, and/or the system provider device discussed above. The device 1300 includes a communication engine 1302 that is coupled to the network 1110 and to an authentication engine 1304 that is coupled to a user database 1306. The communication engine 1302 may be software or instructions stored on a computer-readable medium that allows the device 1300 to send and receive information over the network 1010. The authentication engine 1304 may be software or instructions stored on a computer-readable medium that is operable to provide any of the other functionality that is discussed above. While the database 1306 has been illustrated as located in the device 1300, one of skill in the art will recognize that it may be connected to the authentication engine 1304 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components including software, hardware, and/or both without departing from the scope of the present disclosure. Where applicable, the various hardware components and/or software components set forth herein may be separated into sub-components including software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system associated with a service provider, comprising:

a non-transitory memory storing instructions; and one or more hardware processors coupled with the non-transitory memory and configured to execute the instructions to cause the system to:

receive, from a first merchant application of a user device, (i) a data file generated for a second merchant application of the user device and (ii) transaction data associated with a first transaction being conducted between a user of the user device and a first merchant via the first merchant application, wherein each of the first merchant application and the second merchant application is a non-browser application, wherein the data file was generated based on previously authenticating the user for a second transaction conducted between the user and a second merchant via the second merchant application of the user device and stored on a memory portion of the user device associated with the second merchant application, and wherein the data file is received via the memory portion of the user device from the first merchant application;

authenticate the user for using a user account of the user with the service provider for the first transaction based on data included in the data file and the transaction data; and transmit an authentication signal to the first merchant application, wherein the authentication signal enables the first merchant application to process the first transaction using the user account.

2. The system of claim 1, wherein executing the instructions further causes the system to:

generate the data file based on authenticating the user for the second transaction conducted via the second merchant application.

3. The system of claim 1, wherein the authentication signal comprises financial information associated with the user account and usable for the first transaction.

4. The system of claim 1, wherein executing the instructions further causes the system to:

subsequent to authenticating the user for using the user account for the first transaction, update the data file stored on the user device.

5. The system of claim 1, wherein executing the instructions further causes the system to extend an expiration time of the data file.

6. The system of claim 1, wherein executing the instructions further causes the system to:

prior to receiving the data file from the first merchant application, authenticate the user for the second transaction conducted via the second merchant application of the user device.

7. The system of claim 6, wherein executing the instructions further causes the system to:

subsequent to authenticating the user for the second transaction, cause the second merchant application to store the data file within the memory portion of the user device that is associated with the second merchant application.

8. A method comprising:

receiving, by a computer system associated with a service provider and from a first merchant application of a user device, (i) a data file generated for a second merchant application of the user device and (ii) transaction data associated with a first transaction between a user of the user device and a first merchant, wherein the first merchant application is associated with the first merchant, wherein each of the first merchant application and the second merchant application is a non-browser application, wherein the data file indicates a previous authentication associated with the user for a second transaction conducted between the user and a second merchant associated with the second merchant application via the user device and stored in a memory portion of the user device associated with the second merchant application;

authenticating, by the computer system, the user for using a user account of the user with the service provider for the first transaction based on the data file and the transaction data; and transmitting, by the computer system, information to the first merchant application, wherein the information enables the first merchant application to process the first transaction using the user account.

9. The method of claim 8, further comprising:

generating the information based on financial information associated with the user account.

10. The method of claim 8, wherein the information indicates that a prior authentication of the user is valid.

11. The method of claim 8, further comprising:

prior to receiving the data file from the first merchant application, authenticating the user for the second transaction conducted via the second merchant application of the user device.

12. The method of claim 8, wherein the data file was retrieved by the first merchant application from the memory portion of the user device that is associated with the second merchant application.

13. The method of claim 8, further comprising:

subsequent to authenticating the user for using the user account for the first transaction, updating the data file stored on the user device.

14. The method of claim 8, further comprising replacing an access token stored in the data file.

15. A non-transitory machine-readable medium having stored thereon machine-readable instructions executable to cause a machine associated with a service provider to perform operations comprising:

receiving, from a first merchant application of a user device, (i) authentication data associated with a user of the user device and generated for a second merchant application of the user device, and (ii) transaction data associated with a transaction between the user of the user device and a first merchant associated with the first merchant application, the authentication data generated based on previously authenticating the user for a previous transaction between the user and a second merchant associated with the second merchant application and stored in a memory portion of the user device associated with the second merchant application, and each of the first merchant application and the second merchant application being a non-browser application;

authenticating the user for using a user account of the user with the service provider for the transaction based on the authentication data and the transaction data; and transmitting information to the first merchant application, wherein the information enables the first merchant application to process the transaction using the user account.

16. The non-transitory machine-readable medium of claim 15, wherein the information comprises financial information associated with the user account, and wherein the transaction is processed using the financial information.

17. The non-transitory machine-readable medium of claim 15, wherein the authentication data comprises an access token, and wherein the operations further comprise updating the access token.

18. The non-transitory machine-readable medium of claim 17, wherein the operations further comprise extending an expiration time of the access token.

19. The non-transitory machine-readable medium of claim 15, wherein the operations further comprise:

verifying that an access token included in the authentication data is valid, wherein the authenticating the user is in response to the verifying that the access token is valid.

20. The non-transitory machine-readable medium of claim 15, wherein the operations further comprise:

prior to receiving the authentication data from the first merchant application, authenticating the user for the previous transaction conducted via the second merchant application of the user device; and storing the authentication data in the memory portion of the user device associated with the second merchant application.

* * * * *